United States Patent [19]
Hamdan

[11] Patent Number: 5,348,648
[45] Date of Patent: Sep. 20, 1994

[54] FLOTATION DEVICE FOR THE TREATMENT OF WATER POLLUTED BY HYDROCARBONS

[75] Inventor: Adnan Hamdan, Pau, France

[73] Assignee: CECA, S.A., France

[21] Appl. No.: 956,734

[22] Filed: Oct. 2, 1992

[30] Foreign Application Priority Data

Oct. 3, 1991 [FR] France ............... 91 12197

[51] Int. Cl.$^5$ .................................... B01D 21/24
[52] U.S. Cl. ............................ 210/109; 210/122;
 210/195.1; 210/221.1; 210/319; 210/242.1;
 210/242.3; 210/512.1; 210/512.3; 210/519;
 210/540; 209/169
[58] Field of Search ............ 210/109, 122, 195.1,
 210/202, 208, 219, 221.1, 221.2, 319–320, 512.1,
 512.3, 514, 540, 519, 242.1, 242.3; 209/144, 211,
 169, 168, 170

[56] References Cited

U.S. PATENT DOCUMENTS

| | | | |
|---|---|---|---|
| 2,274,658 | 3/1942 | Booth | 210/540 |
| 3,951,816 | 4/1976 | Bascope et al. | 210/514 |
| 4,404,912 | 8/1977 | Bascope et al. | 210/519 |
| 4,721,562 | 1/1988 | Barnscheidt et al. | 210/221.2 |
| 4,802,592 | 2/1989 | Wessels | 210/169 |
| 4,990,246 | 2/1991 | Blazejczak et al. | 210/109 |
| 5,104,520 | 4/1992 | Maronda et al. | 209/144 |

FOREIGN PATENT DOCUMENTS

| | | |
|---|---|---|
| 2022899 | 8/1990 | Canada . |
| 3808154 | 9/1989 | Fed. Rep. of Germany . |
| 810521 | 9/1956 | United Kingdom . |

*Primary Examiner*—Robert A. Dawson
*Assistant Examiner*—David Reifsnyder
*Attorney, Agent, or Firm*—John L. Sigalos

[57] ABSTRACT

A flotation device for the separation of nonmiscible liquids, particularly the separation of water and hydrocarbon pollutants, comprising a cylindrical tank divided by partitions into a feed flow rate homogenization compartment, at least one flotation cell equipped with a cyclone-turbine and a skimming chamber with self-stabilizing chute, and a tranquilization compartment, characterized in that said cyclone-turbine is equipped with a throttling disk and vortex stabilization baffles, and that the skimming chute is equipped with lateral floats and counterweights.

2 Claims, 6 Drawing Sheets

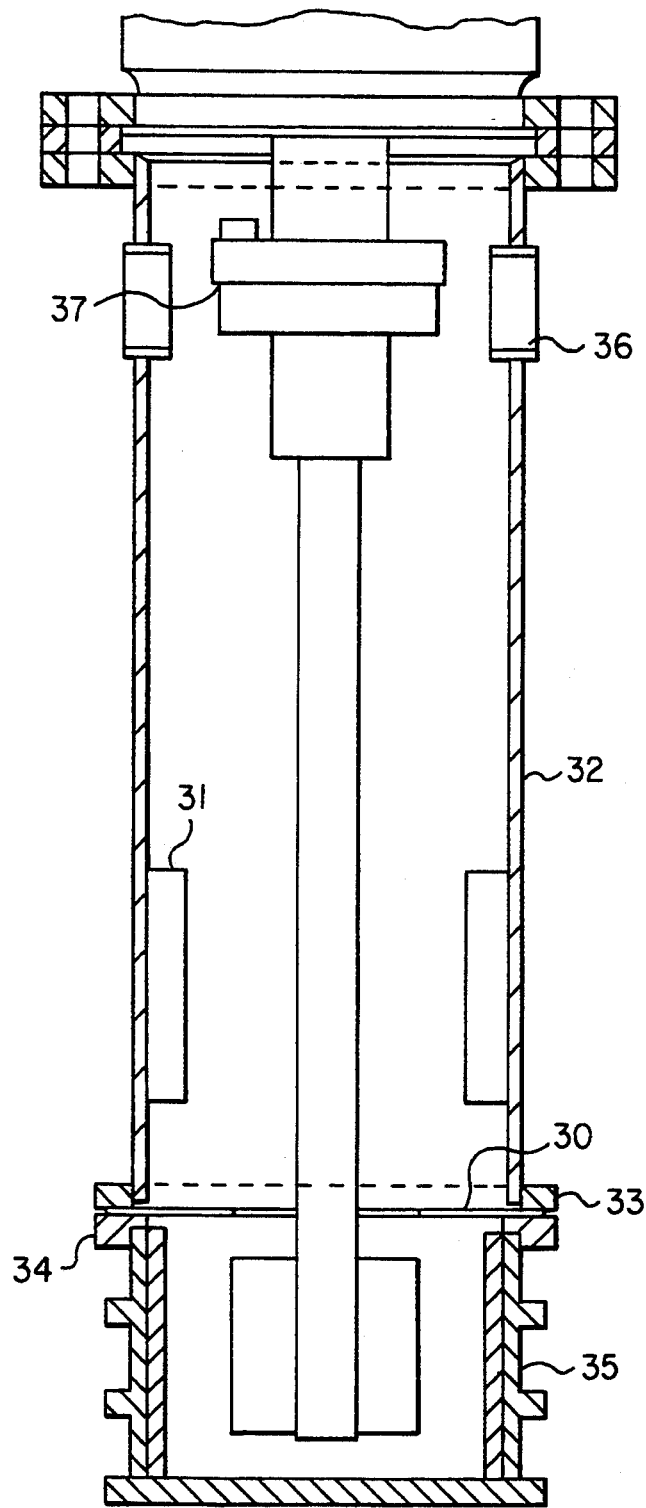
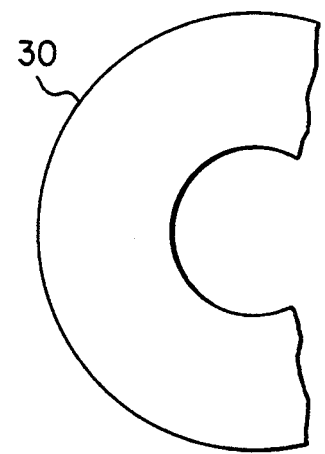
FIG. 2
FIG. 3

FLOTATION DEVICE FOR THE TREATMENT OF WATER POLLUTED BY HYDROCARBONS

BACKGROUND OF THE INVENTION

The present invention pertains to a device for the separation by flotation of nonmiscible liquids. The invention focuses more specifically on the treatment of water polluted by hydrocarbons.

It is known to treat such mixtures of water and hydrocarbons by flotation either with dissolved air (D.A.F. system, "dissolved air flotation") or with induced air or gas (I.A.F. systems, "induced air flotation"). In I.A.F. devices, the induction of air or gas is generated either by means of injectors or by means of rotor-stator type turbines. The device in accordance with the present invention pertains to this latter category. Thus, flotation devices of the I.A.F. type are known which operate by means of turbine-induced injection of air or gas, which devices are constituted of a cylindrical tank with one or more passive zones in which the tranquilization or decantation of the oils takes place, and with one or more active zones in which a rotor/stator unit operates as a flotation-air injection device, and which discharge into one or more collector chambers receiving the froth formed in the active compartments. Information on these devices can be found in the manufacturers' bulletins and in various patents, e.g., French Patent No. 2,605,898.

The role of the turbines is to induce, via rotation of the rotor, a depression in the stack above them, thereby drawing in the covering gas and directing it against the stator, thereby creating around the stator the cloud of gas which will generate the flotation. These turbines are simply constituted, in accordance with the prior art, of a rotor with mobile blades inside the cage of a stator with fingers of rectangular section. These units have a certain number of drawbacks:

a) instability of the flow rate of the air or gas due to the rupture of the diphasic flow profile in the rotor's stack; the rotor rotates in a diphasic water/air medium, which results in a considerable fluctuation in the electrical power absorbed;

b) periodic ascension of the vortex up to the air-induction point, leading to water being directed onto the froths, thereby inducing their partial redissolution;

c) the flotation effect is not assured with turbines handling flow rates greater than 50 m³/hour since the turbines only act as agitators because the depression created by the rotor is not sufficient to carry the covering gas to the stator; and d) impossibility of varying the ratio between the water flow rate and the air or gas flow rate.

For these reasons, even the operation of these units at the pilot scale is acceptable, when the equipment described in the prior art is produced at industrial scale the flotation effect is not satisfactory.

The skimming chutes in accordance with the prior art are self-stabilizing. Nevertheless, they are not equipped with any possibilities for regulating their immersion, their skimming perimeter is very small, their horizontality is very difficult to maintain and their flotation is uncertain, i.e., the chute can partially emerge from the water or leak; the result is that the skimming of the froths is very imperfect and the device becomes totally unstable after several weeks of operation.

SUMMARY OF THE PRESENT INVENTION

The device in accordance with the makes it possible to resolve these drawbacks. It is constituted (FIG. 1) of the cylindrical tank divided by partitions into several distinct compartment: a compartment for homogenizing the feed flow rate (1), flotation cells (2) and a tranquilization compartment (3), possibly followed by a pot acting as the hydraulic seal with the exterior.

BRIEF DESCRIPTION OF THE DRAWINGS

FIG. 2 is a cross-sectional view of a cyclone-turbine(4) of FIG. 1;

FIG. 3 a partial plan view of throttling disk (30) of FIG. 2;

DETAILED DESCRIPTION

Figure 1:
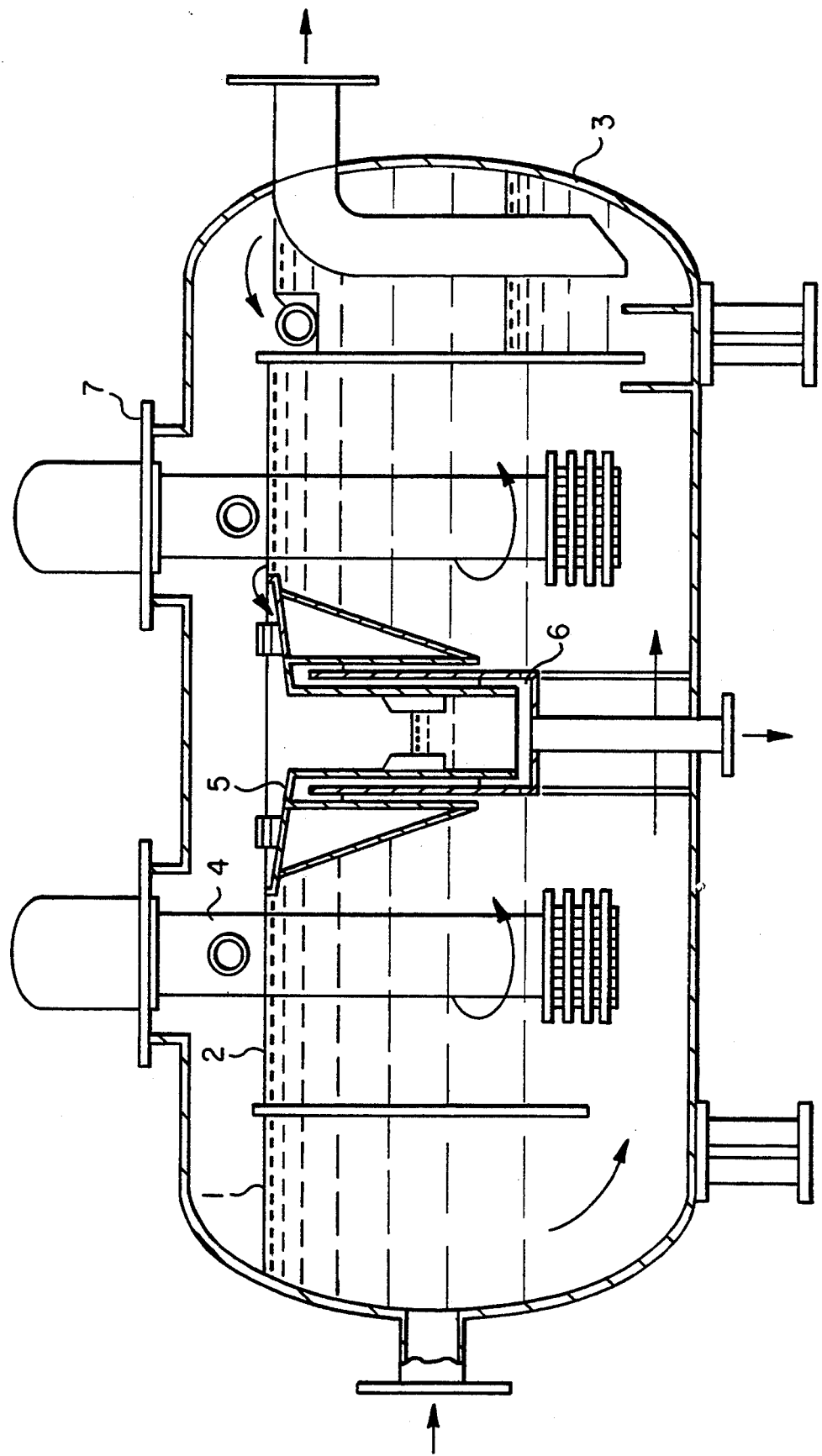
FIG. 1 is a sectional view of the flotation device in accord with the present invention.
Figure 6:
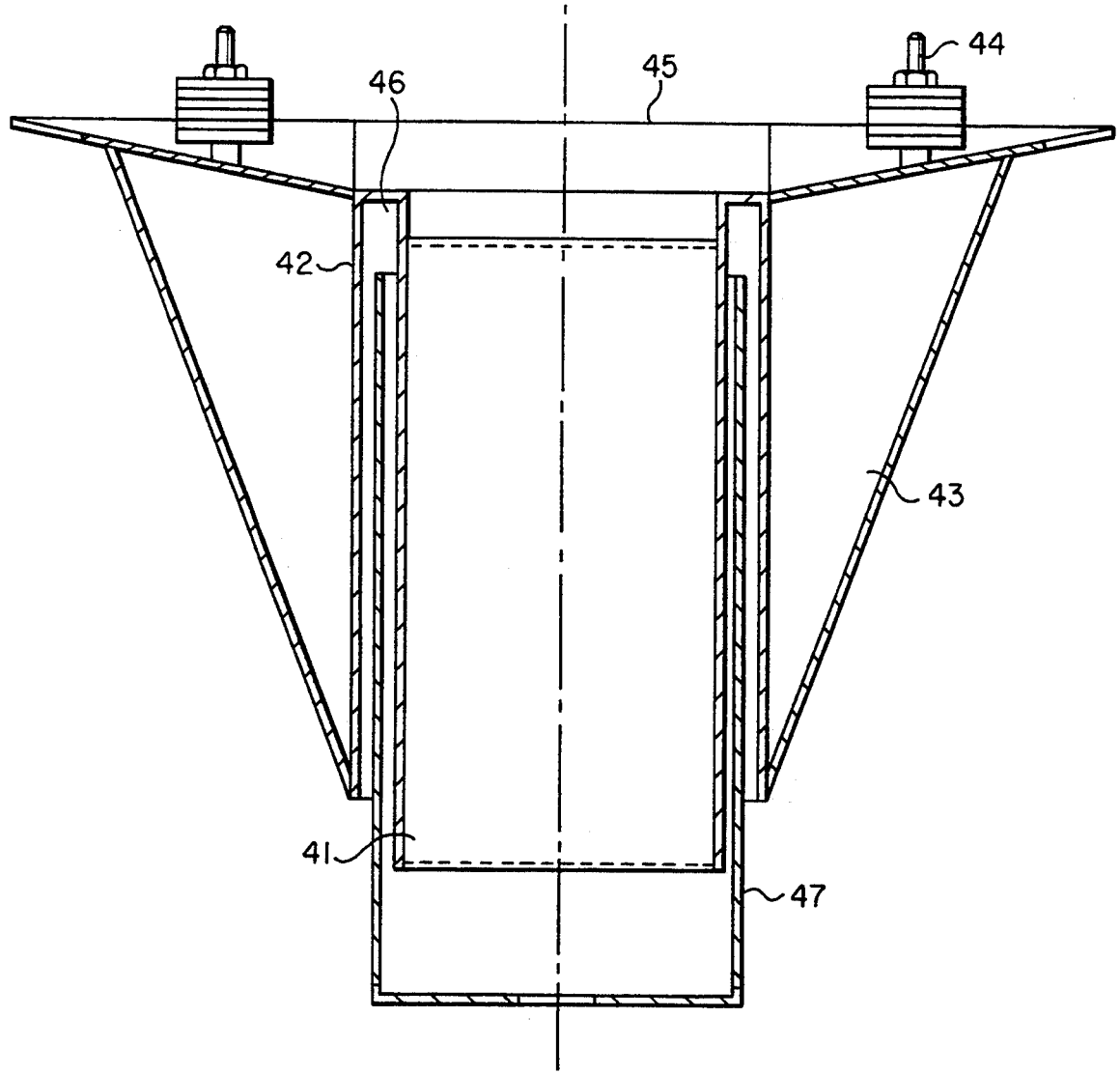
FIG. 6 is a sectional view of chute (5) in accord with the present invention.

Referring to FIG. 1 each cell is equipped with a cyclone-turbine (4) and a self-stabilizing chute (5) in common with an adjustable cell. The chute can be displaced vertically by means of a skimming chamber (6), the fixed walls of which (47 in FIG. 6) act as a guide-support for the chute.

Figure 4:
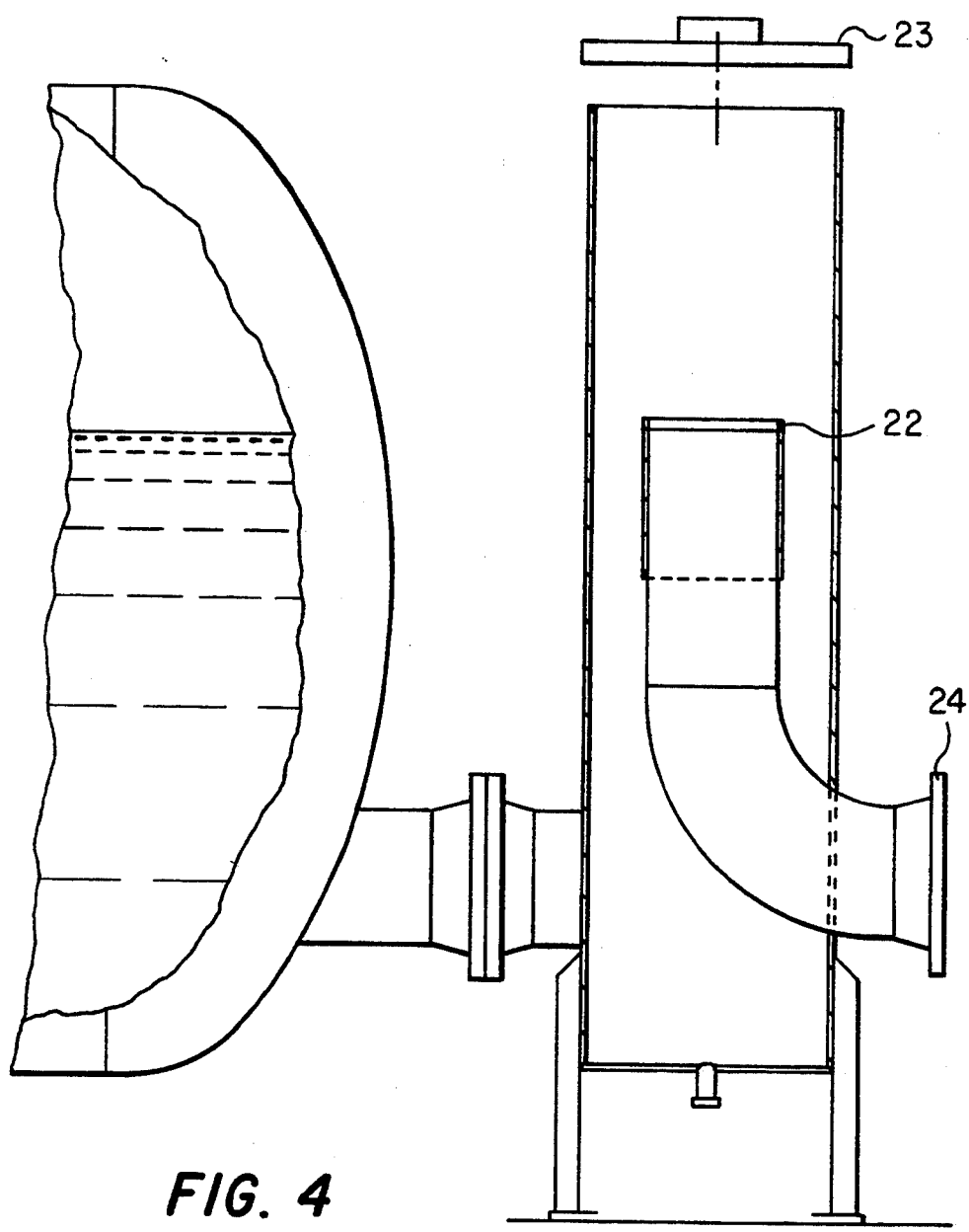
FIG. 4 is a sectional view of a pot (21) in accord with the present invention.

The cyclone-turbines (FIGS. 2 and 4) are of the stator-rotor type. They are each equipped with a throttling disk (30) making it possible to create a depression which is sufficient to overcome the water column above the rotor. This disk (FIGS. 2 and 3) is several millimeters thick and is installed between the flanges of the stack and the cage of the stator (35). It is made of stainless steel and has a diameter approximately equal to the exterior diameter of the rotor. Baffles (31) are welded on the inside walls of the rotor's stack (32). There are preferably three baffles which are arranged symmetrically about thirty centimeters from the flange (33–34). The baffles are preferably made of steel. Indicatively, their dimension are between 100×40×6 mm and 200×60×4 mm. These baffles make it possible to obtain a flow profile with a stable vortex. The combination of a tangential velocity of the rotor with the throttling disk and the vortex-stabilization baffles make it possible for the turbine to generate a regular diphasic gas/water flow. The water: gas flow rate ratio is on the order of three. The purpose of a stack crosspiece is to prevent ascension of the vortex which would result in water being directed onto the froths formed on the exterior of the stack. It should be noted that the use of these improved turbine-cyclones is not limited to flotation devices but can be extended to any gas-liquid application.

The stator (35) of the cyclone-turbine in accordance with the invention is advantageously made of polypropylene; the rotor, which is made of common material (stainless steel) has a reduced number, preferably six, of blades. In addition, these cyclone-turbines are installed in a manner such that it is possible to put them in either a high or low position, with the high position being the ordinary position and the low position being obtained by inserting a piece between the coupling flanges (37).

The thickness of this piece makes it possible to act directly on the gas flow rate.

Figure 7:
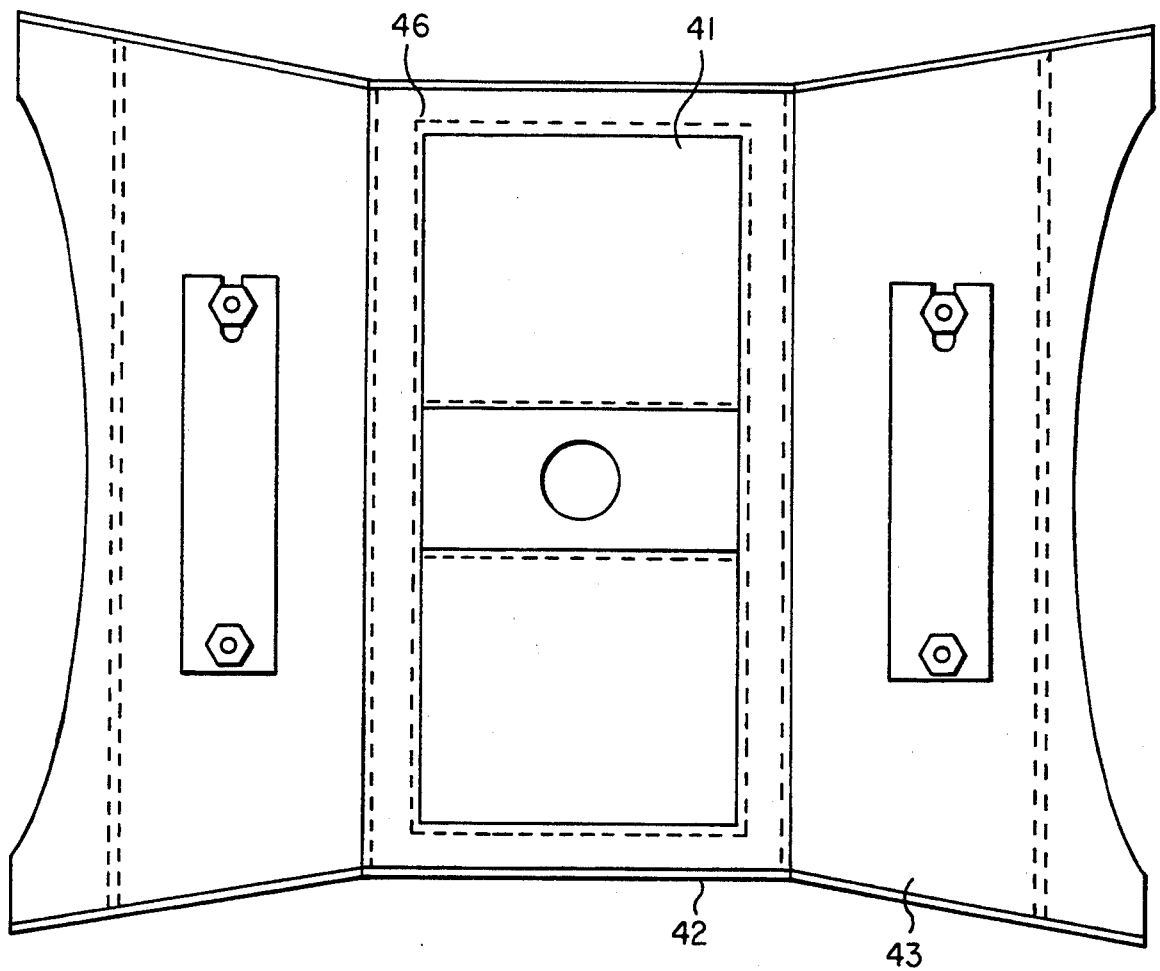
FIG. 7 is a top plan view of the chute of FIG. 6.

The improved chutes (FIGS. 6 and 7) in accordance with the invention have two vertical floats (41), an exterior skirt (42), two lateral floats (43) for which the skirt acts as a guiding mechanism, and two counterweight units (44). Skimming of the froths takes place in a homogeneous manner over the wide perimeter of the chute (45) and the recovered froths are discharged (A) via the bottom of the chambers.

The dimensions of the chutes take the following factors into account:

(i) overall dimensions of the flotation device,
(ii) froth flow rate,
(iii) range of variation in the flow rate of the water to be treated,
(iv) dimensions of the support flanges of the cyclone turbines (7), and
(v) volume of the vertical floats (41), lateral floats (43) and of the volume of air or gas retained in the space between the exterior skirt (42) and the floats and which constitutes the pneumatic seal (46).

The dimensions of the floats are in accordance with the following principles:

a) the sum of the volumes of the vertical and lateral floats multiplied by the density of the liquid to be treated must be greater than the total weight of the chute; and b) the sum of the mean volumes of the vertical and lateral floats of the pneumatic seal multiplied by the density of the liquid to De treated must be equal to the total weight of the chute when it is in the high position.

For the engineer, these principles will be translated into equations with multiple unknowns. These equations can only be solved by the selection of a certain number of dimensions, such as the dimensions of the internal floats.

The real weight of the bare chute must remain slightly lighter than the theoretical weight; equilibrium will be achieved by adding counterweights. The use of this counterweight solutions has the following advantages:

(i) for the designer of the chute, it facilitates the numerical solution of these two equations by carrying out first order simplifications;

(ii) flexibility at the operating level, since in this strongly aerated medium its apparent density is different from that of the water to be treated, especially at the flow surface; and (ii) easy correction of the control of the immersion and horizontality of the chute, the weight of which is modified during operation because of encrustation by bituminous or other products, by acting on the counterweights without disturbing the overall operation of the flotation device.

Figure 8:
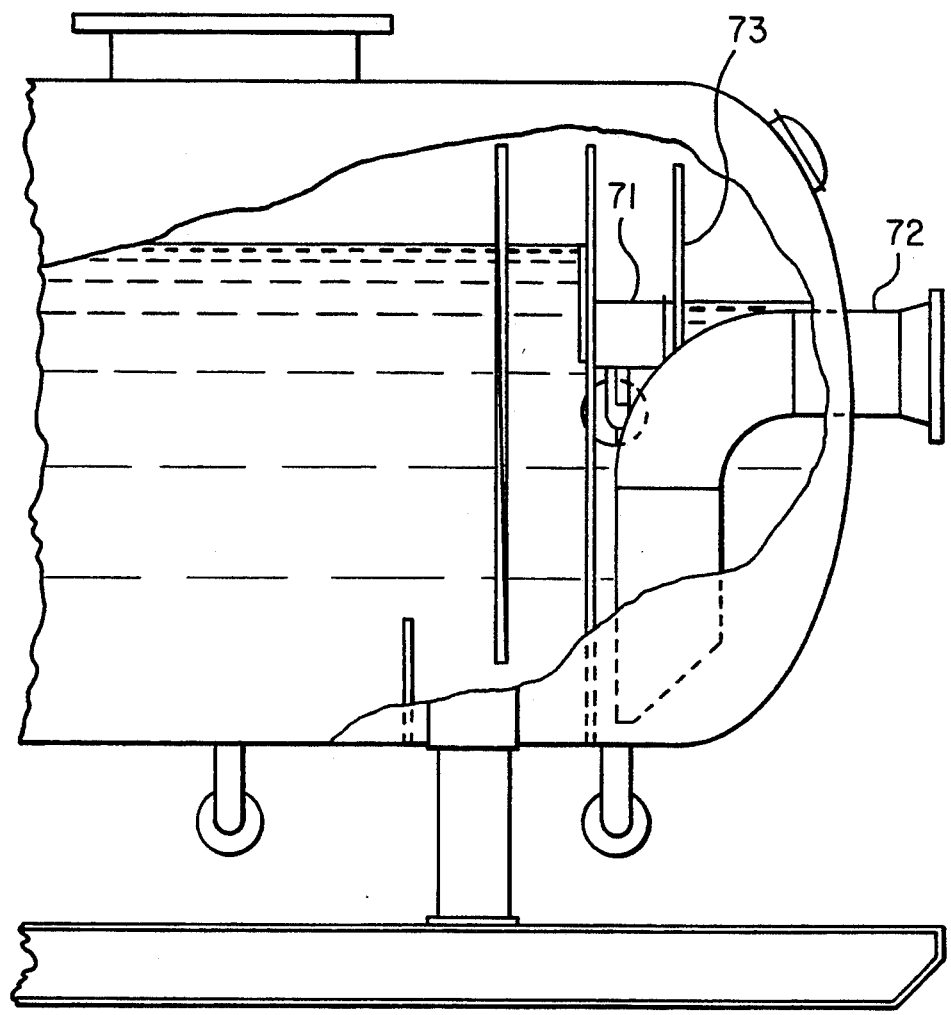
FIG. 8 is a partial section view of a portion of the last compartment in the device depicted in FIG. 1.

The chutes are made of stainless steel or any other material capable of resisting the aggressive nature of the medium (high salinity, presence of hydrocarbons, $H_2S$, $CO_2$, etc.). If plastic is used for their construction, they must be made heavier by ballasting with lead beads. These chutes operate practically without requiring any control or intervention. This advantage is reflected in the general operation of the flotation device, which requires almost no maintenance.

the last compartment of the tank (3) assures tranquilization of the effluent and separation out of the oil droplets larger than circa 60 micrometers which escaped the last flotation cell. Tranquilization is produced in the compartment (see FIG. 8) by means of hydraulic retention maintained by the positioning of the outlet pipe (72). The decanted oils are recovered by a chute with an adjustable sill (71); siphoning out of the water is made impossible by an aeration tube (73). Skimming of the oils can be carried out either continuously or intermittently.

Figure 5:
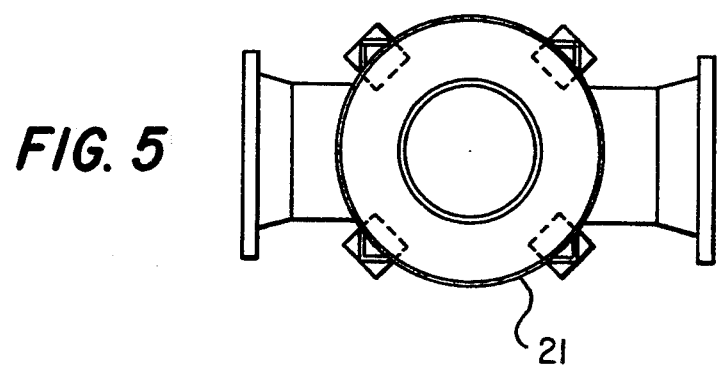
FIG. 5 is a top plan view of the pot of FIG. 4.

In the case of an installation operating under gas cover, tranquilization is completed by a pot (21) installed downstream of the flotation device (FIGS. 4 and 5) and which assures tightness. The water level in the compartment (3) to which it is connected is regulated by means of an adjustable sill (22) accessible via the top part (23) of the equipment. The body of the pot is constituted of a tube with a diameter approximately twice the diameter of the outlet pipe (24). The sill (22) is connected to the outlet pipe by a helicoidal thread, and its elevation is easily achieved by turning it in one direction or the other. The height of the water in the pot and the elevation of the pot are determined in a manner such as to overcome the pressure of the covering gas (which is on the order of several tens of millibars). This solution is particularly advantageous because it simplifies considerably the architecture of the flotation system's cylindrical tank, which results in improvement of the device, the last compartment of which is essentially devoted to skimming the oils which are decanted there, as well in appreciable cost savings in construction. These are additional cost savings because there is no need for delicate instruments such as a level detector and a regulation blade which were required in the prior art for installation of the hydraulic seal.

Created in this manner, these induced air injection devices are improved devices which make it possible to correctly control the air and gas flow rates and the water: air (gas) ratio, and to control the production and discharge of the froths. The material used for these devices are light, their construction costs are low and their consumption of energy is reasonable.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A flotation device for the separation of oils, creams, or froths floating on the surface of aqueous liquids, comprising a cylindrical tank divided by partitions into a feed-flow rate homogenization compartment, at least one flotation cell equipped with (a) a cyclone-turbine comprising a rotor with mobile blades housed in a stator cage and a stack positioned above the cyclone-turbine and (b) a skimming chamber with a self-stabilizing chute, and a tranquilization compartment, said cyclone-turbine having a throttling disk positioned between said stator cage and said stack and vortex stabilization baffles attached to the inside wall of said stack, said skimming chute being displaced vertically with respect to the surface of the aqueous liquid in said at least one flotation cell, and said skimming chute being self-stabilizing and comprising an exterior skirt having attached thereto two counterweights, two lateral floats, and two vertical floats which act to maintain said skimming chute at the surface of the aqueous liquids.

2. The flotation device of claim 1 also including a connecting pot attached to said flotation device at said tranquilization compartment to assure a seal between a capacity under gas cover and the exterior, said pot comprising a cylindrical body inside of which extends vertically an outlet pipe, having an adjustable sill displaced vertically in relation to the interior upper end.

* * * * *